United States Patent
Fu et al.

(10) Patent No.: US 8,701,073 B1
(45) Date of Patent: Apr. 15, 2014

(54) SYSTEM AND METHOD FOR ACROSS-CHIP THERMAL AND POWER MANAGEMENT IN STACKED IC DESIGNS

(71) Applicant: Taiwan Semiconductor Manufacturing Co., Ltd., Hsin-Chu (TW)

(72) Inventors: Chung-min Fu, Chungli (TW); William Wu Shen, Hsinchu (TW); Po-Hsiang Huang, Tainan (TW); Meng-Fu You, Changhua (TW); Chi-Yeh Yu, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/683,901

(22) Filed: Nov. 21, 2012

Related U.S. Application Data

(60) Provisional application No. 61/707,086, filed on Sep. 28, 2012.

(51) Int. Cl.
*G06F 9/455* (2006.01)
*G06F 17/50* (2006.01)

(52) U.S. Cl.
USPC ........... 716/133; 716/106; 716/108; 716/111; 716/112; 716/113; 716/120; 716/134; 716/136

(58) Field of Classification Search
USPC ......... 716/106, 108, 111, 112, 113, 120, 133, 716/134, 136
See application file for complete search history.

(56) References Cited

U.S. PATENT DOCUMENTS

| | | | |
|---|---|---|---|
| 6,441,350 B1 * | 8/2002 | Stoddard et al. | 219/497 |
| 6,847,853 B1 * | 1/2005 | Vinciarelli et al. | 700/97 |
| 7,627,841 B2 * | 12/2009 | Shakouri et al. | 716/136 |
| 8,019,580 B1 * | 9/2011 | Chandra et al. | 703/6 |
| 2008/0026493 A1 * | 1/2008 | Shakouri et al. | 438/17 |
| 2008/0072182 A1 * | 3/2008 | He et al. | 716/2 |
| 2008/0168406 A1 * | 7/2008 | Rahmat et al. | 716/2 |
| 2009/0024969 A1 * | 1/2009 | Chandra | 716/5 |

OTHER PUBLICATIONS

"Thermal Analysis of Semiconductor Systems", Freescale Semiconductor, Inc., © Freescale Semiconductor, Inc. 2008, 24 pages.

(Continued)

*Primary Examiner* — Vuthe Siek
*Assistant Examiner* — Brian Ngo
(74) *Attorney, Agent, or Firm* — Duane Morris LLP

(57) ABSTRACT

A computer implemented method comprises accessing a 3D-IC model stored in a tangible, non-transitory machine readable medium, inputting a power profile in a computer processor, generating a transient temperature profile based on the 3D-IC model, identifying a potential thermal violation at a corresponding operating time interval and a corresponding location of a plurality of points of the 3D-IC design, and outputting data representing the potential thermal violation. The 3D-IC model represents a 3D-IC design comprising a plurality of elements in a stack configuration. The power profile is applied to the plurality of elements of the 3D-IC design as a function of an operating time. The transient temperature profile includes temperatures at a plurality of points of the 3D-IC design as a function of an operating time.

17 Claims, 14 Drawing Sheets

(56) References Cited

OTHER PUBLICATIONS

Sridhar, A. et al., "3D-ICE: Fast Compact Transient Thermal Modeling for 3D ICs with Inter-tier Liquid Cooling", 2010 IEEE/ACM International Conference on Computer-Aided Design (ICCAD), Nov. 2010, pp. 463-470.

Cong, J. et al., "A Thermal-Driven Floorplanning Algorithm for 3D ICs", ICCAD '04 Proceedings of the 2004 IEEE/ACM International Conference on Computer-Aided Design, pp. 306-313.

Jain, P. et al., "Thermal and Power Delivery Challenges in 3D ICs", Chapter 3: Three-Dimensional Integrated Circuit Design, Y. Xie et al. (eds.), Springer Science+Business Media, 2010. pp. 33-61.

* cited by examiner

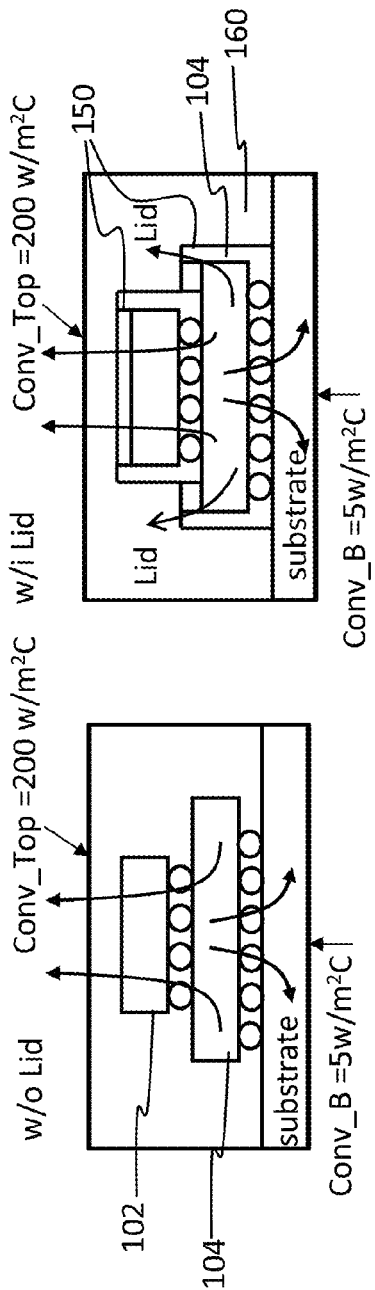
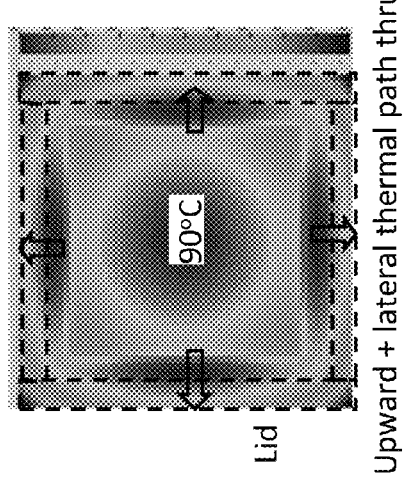
FIG. 11C
FIG. 11A
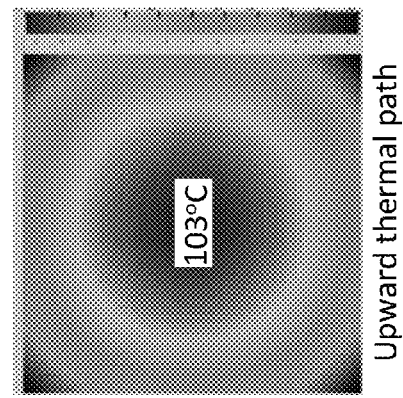
FIG. 11D
FIG. 11B

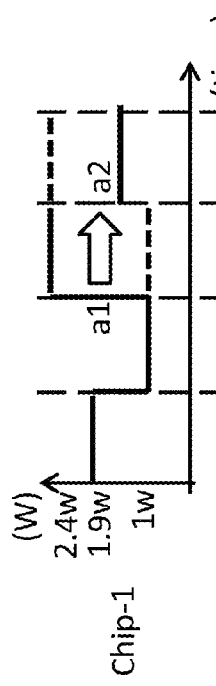
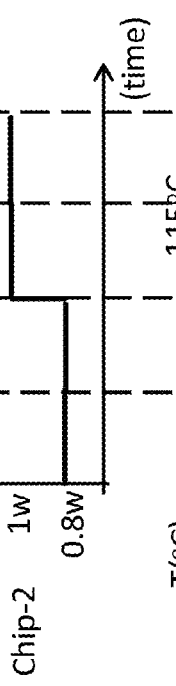
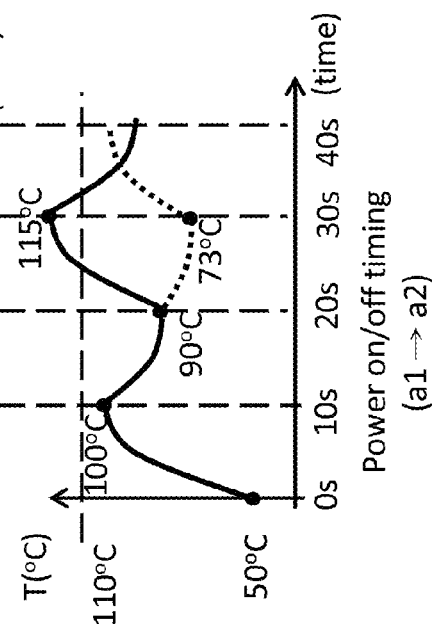
FIG. 12A
FIG. 12B
FIG. 12C

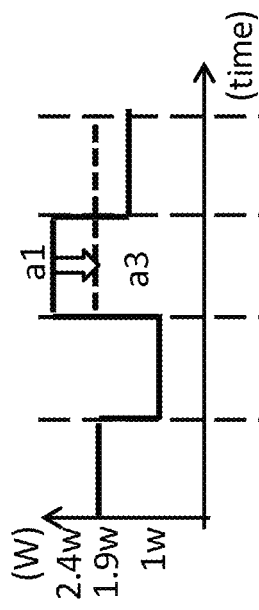
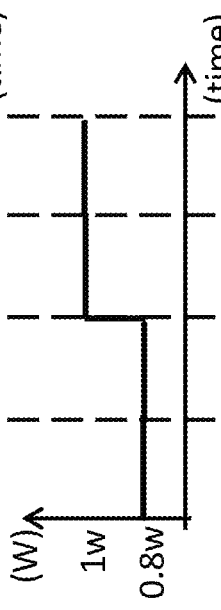
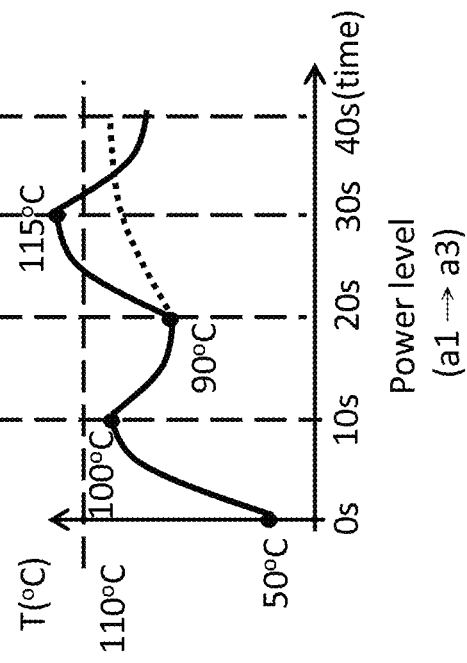
FIG. 13A
FIG. 13B
FIG. 13C

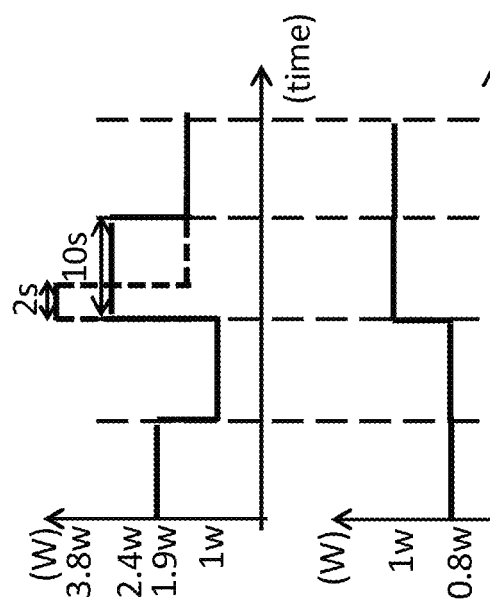

SYSTEM AND METHOD FOR ACROSS-CHIP THERMAL AND POWER MANAGEMENT IN STACKED IC DESIGNS

CROSS-REFERENCE TO RELATED APPLICATIONS

The This application claims the benefit of U.S. Provisional Application No. 61/707,086, filed Sep. 28, 2012, which application is expressly incorporated by reference herein in its entirety.

FIELD

The disclosed system and method relate to semiconductors. More particularly, the disclosed subject matter relates to computer-implemented automated tools for modeling, simulation and design of integrated circuits.

BACKGROUND

Integrated circuits ("ICs") are incorporated into many electronic devices. IC packaging has evolved, such that multiple ICs may be vertically stacked in so-called three-dimensional ("3D") packages in order to save horizontal area on a printed circuit board ("PCB"). An alternative packaging technique, referred to as a 2.5D package may use an interposer, which may be formed from a semiconductor material such as silicon, for coupling one or more dies to a substrate. Pluralities of IC chips, which may be of heterogeneous technologies, are mounted on the interposer. Connections among the various ICs are routed through conductive patterns in the interposer. These interposer and stacked IC techniques are called 2.5D-IC and 3D-IC, respectively.

The increased level of integration and packing density associated with stacked IC designs results in potential thermal and power delivery problems. For example, localized overheating may occur in a chip or cross chip when the stacked IC design is operated under a certain power level. The thermal and power problems decrease the reliability of integrated circuits, and eventually may cause degradation or failure of a semiconductor device. So the thermal and power management becomes very important in stacked ICs such as 3D-IC, including the package over the stacked ICs, when the interconnect width decreases to hundreds or tens of nanometers.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIGS. 11A-11D illustrate a method for reducing chip temperature in a 3D-IC design using a package comprising thermal interface materials and a lid.

FIGS. 12A-12C illustrate a method for mitigating thermal violation in a 3D-IC design by changing a time for turning on or off one element in the 3D-IC design.

FIGS. 13A-13C illustrate a method for mitigating thermal violation in a 3D-IC design by changing a power level to be applied on one element in the 3D-IC design.

FIGS. 14A-14C illustrate a method for mitigating thermal violation in a 3D-IC design by changing a time for turning on or off one element in the 3D-IC design, and changing a power level to be applied on the element, in accordance with some embodiments.

DETAILED DESCRIPTION

Figure 1:
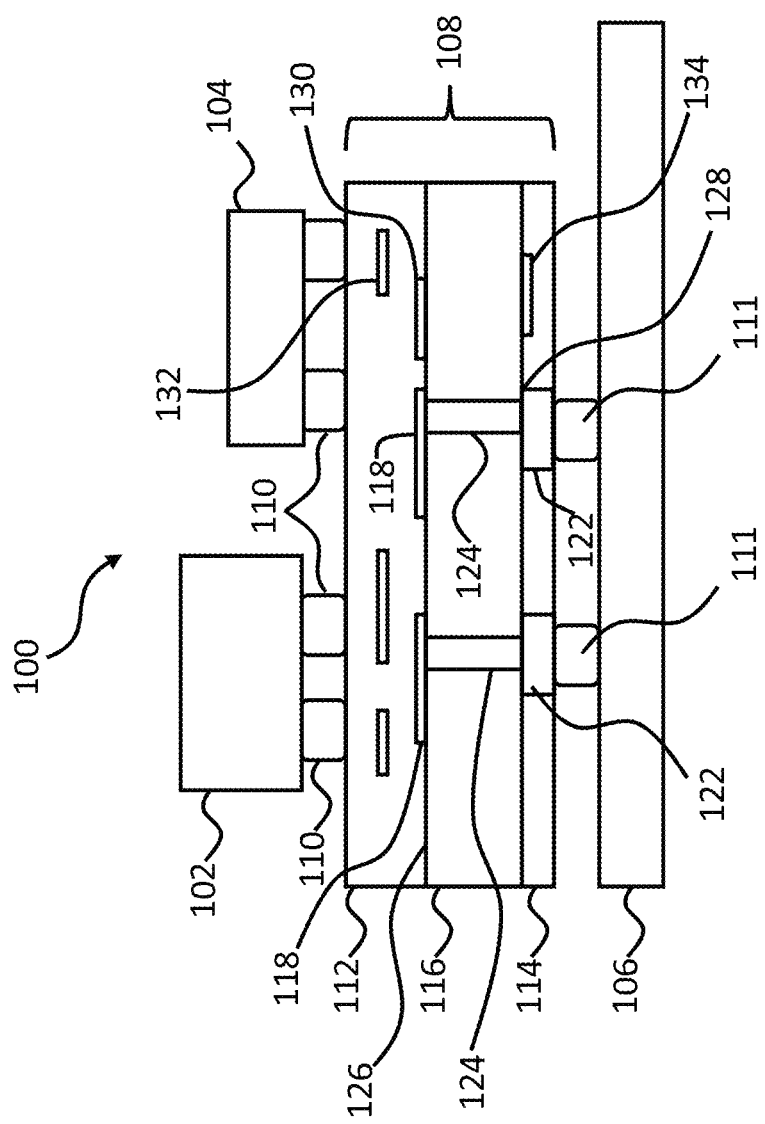
FIG. 1 is a diagram of a 2.5D IC having a semiconductor interposer.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For brevity, references to a "3D-IC" or "3D-ICs" made in this disclosure will be understood to encompass both 2.5D-ICs (including a semiconductor interposer) and 3D-ICs (including vertically stacked dies), unless expressly indicated otherwise. References to "stacked IC design" will be understood to encompass any 3D-IC design in any stack configuration. References to a "3D-IC design" will be understood to encompass a 3D-IC device or a part of a 3D-IC device comprising a plurality of elements in a stack configuration and possibly a package in some embodiments. References to a "3D-IC model" will be understood to encompass a computer model, which represents a 3D-IC design, and is stored in a tangible, non-transitory machine (e.g., computer) readable medium.

References to an "element" or "elements" in a 3D-IC design will be understood to encompass any parts in the 3D-IC design, which include, but are not limited to, semiconductor chips, ICs, dies, and interposers. References to "packages" will be understood to encompass any materials or parts applied on, over or above the elements of the 3D-IC design, which include but are not limited to thermal interface materials and lids. References to a "point" or "points" of the 3D-IC design will be understood to encompass any portion of an element or a package in the 3D-IC design, which include, but are not limited to, portions or basic units divided for the purpose of a FEA modeling.

For example, FIG. 1 illustrates one example of a 2.5-dimensional ("2.5D") IC package 100 in which first and second IC chips 102, 104 are coupled to an interposer 108, which is in turn mounted on a package substrate 106. IC chips 102, 104 can be bonded to interposer 108 using small conductive bumps 110, which are also referred to as "microbumps" or "μ-bumps". Interposer 108 is bonded to package substrate 106 by conductive bumps 111. Microbumps 110 connecting IC chips 102, 104 to interposer 108 may have different sizes and electrical properties than the bumps 111 connecting the interposer 108 to PCB 106.

Interposer 108 includes a semiconductor substrate 116 having a front-side and a back-side interconnect layers 112, 114 formed on its front and back major surfaces, respectively. In some applications, substrate 116 is not grounded and thus is electrically floating. Front-side and back-side interconnect layers 112, 114 each can comprise a plurality of inter-metal dielectric (IMD) layers, which include via level layers (V1, V2, etc.) and metal line level layers (e.g., M1, M2, etc.).

As shown in FIG. 1, front-side interconnect layer 112 may include conductors 118, 130 disposed in a first metal layer (i.e., M1) and a conductor 132 disposed in a second metal layer (i.e., M2). Conductor 118 in front-side interconnect layer 112 may be electrically connected to metal conductor 122 in back-side interconnect layer 114 by way of a through-silicon via ("TSV") 124 that extends from front-side surface 126 of semiconductor substrate 116 to rear-side surface 128 of semiconductor substrate 116. Front-side and back-side interconnect layers 112, 114 can also include conductors 130, 132, 134 that are not connected to each other.

The embodiments described herein provide a computer implemented method and a system for thermal and power management in stacked IC design such as 3D-IC design. The method and the system characterize and provide a temperature profile showing the temperature at each of a plurality of points or each of a plurality of elements in a 3D-IC design, when the 3D-IC design is operated under a certain condition such as a power profile applied to the elements of 3D-IC. A temperature profile can be obtained in either a steady state or a transient state. All the chips and other elements of the 3D-IC are considered during generating a temperature profile. Potential "thermal violation" can be identified based on the temperature profile. References to "thermal violation" made in this disclosure will be understood to encompass a situation where a temperature at a certain point of 3D-IC design at an operating time interval is higher than a predetermined value for safe operation. A potential thermal violation can be then mitigated accordingly. For example, potential thermal violations can be mitigated by changing the power profile as a function of the operating time in order to lower the temperature of the 3D-IC during operation. The power profile is not constant in some embodiments. A dynamic power profile is used. Alternatively, potential thermal violations can be mitigated by changing the 3D-IC design to achieve a 3D-IC design that provides a lower temperature during operation for a given power profile and avoid potential thermal violations.

Figure 2:
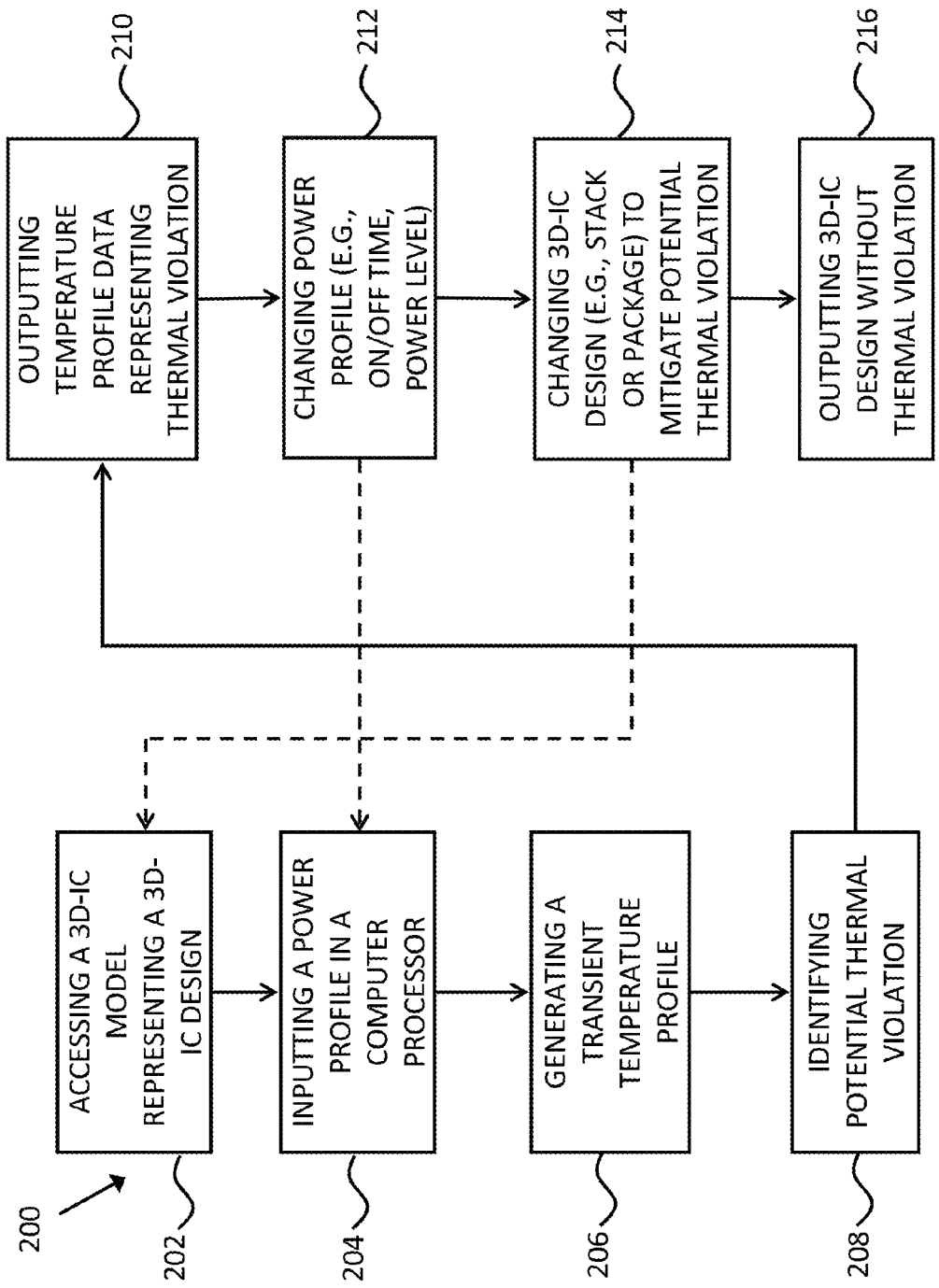
FIG. 2 is a flow chart of a computer implemented method for characterizing transient temperature profile, and changing a power profile or designing a new or revised 3D-IC, in accordance with some embodiments.

FIG. 2 is a flow chart of a computer implemented method 200 for characterizing transient temperature profile, and changing a power profile or designing a new or revised 3D-IC, in accordance with some embodiments. At step 202, a 3D-IC model stored in a tangible, non-transitory machine readable medium is accessed from a computer processor. The model represents a 3D-IC design to be fabricated and to be operated under a certain condition. The 3D-IC design comprises a plurality of elements such as semiconductor chips and an interposer in a stack configuration. In some embodiments, the 3D-IC design comprises a package. Examples of a package include but are not limited to thermal interface materials, and lids. For example, a circuit design may include at least two silicon-based chips, an interposer, and conductive microbumps, which are packaged three dimensionally on a substrate. The model may also be a single chip of a 3-D architecture interconnected by TSVs. The 3D-IC model may include any circuit design including plural dies in a single package.

Figure 3:
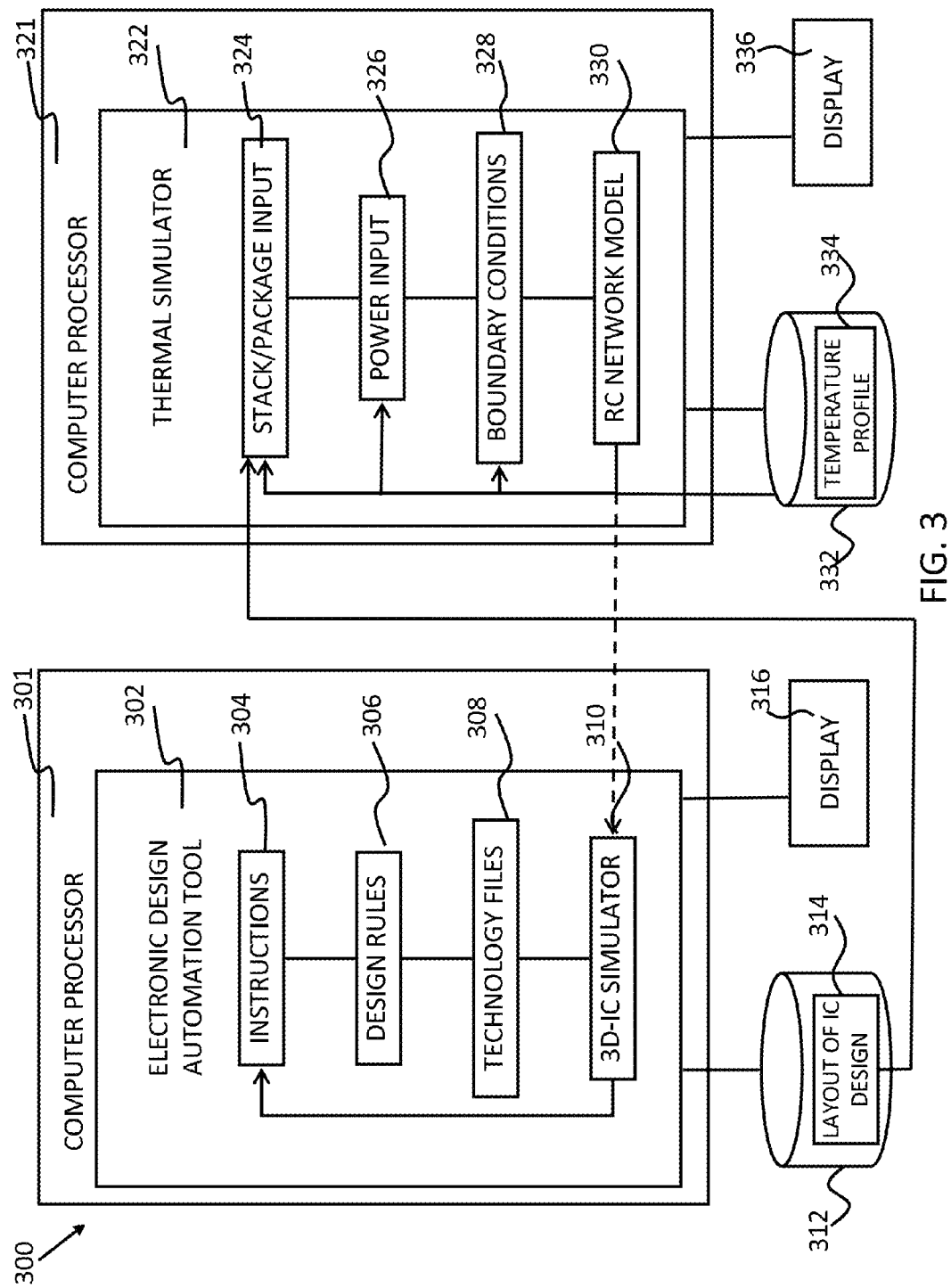
FIG. 3 is a block diagram of a system for modeling and designing a 3D-IC by using the method of FIG. 2.

The 3D-IC model can be generated on a computer processor 301 before step 202. Referring to FIG. 3, for example, such a 3D-IC model can be generated using an electronic design automation (EDA) tool 302 in a system 300. Examples of suitable EDA tools include, but are not limited to "ADVANCED DESIGN SYSTEM (ADS)"™, sold by Agilent of Santa Clara, Calif. Other EDA tools 302 may be used, such as the "CADENCE® VIRTUOSO® SPECTRE®" circuit simulator, sold by Cadence Design Systems, Inc. of San Jose, Calif.; and "IC COMPILER"™, sold by Synopsys, Inc. of Mountain View, Calif. The processor 301 is programmed to run the tool to analyze a circuit to determine a response of the circuit to an input RF signal, for at least one of designing, manufacturing, and testing the circuit. In other embodiments, the EDA tool may be implemented in special purpose hardware including application specific integrated circuitry, for example.

EDA tool 302 is a special purpose computer formed by retrieving stored program instructions 304 from a non-transient computer readable storage medium 312, and executing the instructions on a general purpose processor 301. Examples of persistent, non-transitory computer readable storage medium 312 include, but are not limited to, read only memories ("ROMs"), random access memories ("RAMs"), flash memories, or the like. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities. Tangible, non-transient machine readable storage medium 312 is configured to store inputs used by the EDA tool 302 and layout of IC design data. Input can include information for IC designs. Input can include design rules 306 and technology files 308. Through a 3D-IC simulator 310, a 3D-IC model can be generated, stored and output in tangible, non-transitory machine readable medium 312.

At step 202, the 3D-IC can be accessed from the same computer processor 301 or a different computer processor 321 shown in FIG. 3. In some embodiments, computer processors 301 and 321 can be one computer processor. The input 324 including stack configuration and package are provided to a thermal simulator 322 in the computer processor 321 of FIG. 3.

Referring back to FIG. 2, at step 204, a power profile is input in a computer processor, for example, in processor 321 of FIG. 3. The power profile 326, being a function of an operating time, is applied to the plurality of elements in the 3D-IC design to be operated under the condition. For example, the power profile 326 can include a respective profile representing power levels applied to each chip in the 3D-IC design as a function of operating time.

At step 206, a transient temperature profile 334 is generated in the computer processor 321 of FIG. 3, based on the 3D-IC model generated by the EDA tool 302. Such a transient temperature profile 334 includes temperatures at a plurality of points of the 3D-IC design as a function of an operating time, based on the 3D-IC design operating under the power input and the operation condition. The transient temperature profile 334 can be a response of the power profile as a function of the operating time in a non-steady state. In some embodiments, generating a transient temperature profile 334 based on the 3D-IC model comprises: inputting a set of boundary conditions as the condition under which the 3D-IC design is to be operated; and performing a finite element analysis on each of the plurality of points in the 3D-IC design based on a thermal resistance-capacitance (RC) network model.

Figure 4:
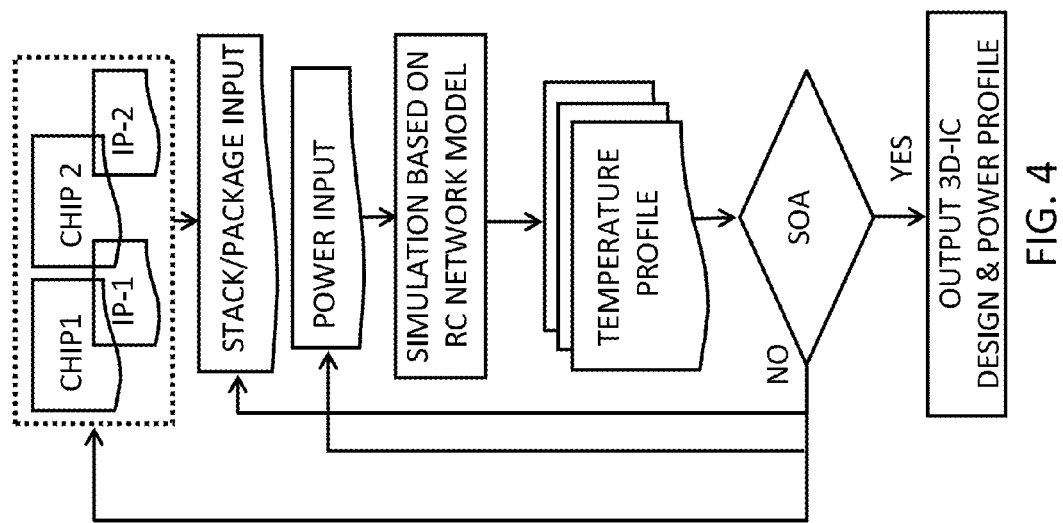
FIG. 4 is a flow chart illustrating a program for generating a temperature profile in some embodiments.
Figure 5:
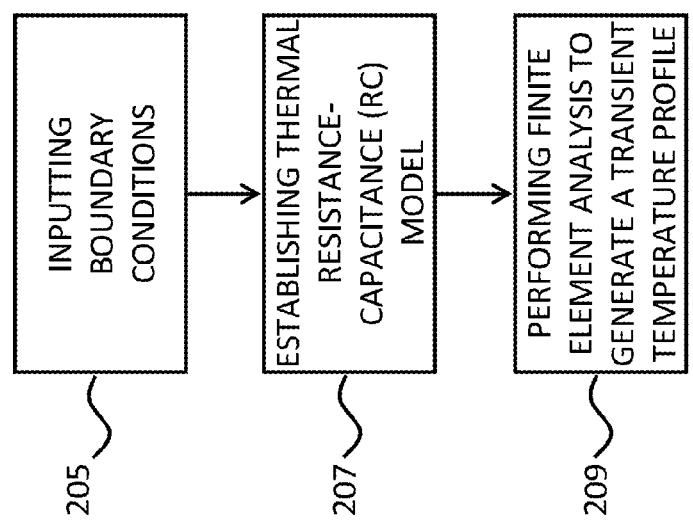
FIG. 5 is a flow chart of a method for generating a transient temperature profile through finite element analysis (FEA) modeling in accordance with some embodiments.

FIG. 4 is a flow chart illustrating a program diagram for generating a temperature profile in some embodiments. As shown in FIG. 3 and FIG. 4, the data for the 3D-IC design including a layout of IC design 314, stack configuration and packages input 324, and power profile 326 are provided to thermal simulator 322 in computer processor 321. A simulation based on RC network models is performed to generate a temperature profile 334. For example, FIG. 5 illustrates a method for generating a transient temperature profile 334 through finite element analysis (FEA) modeling in accordance with some embodiments.

In some embodiments, each of the plurality of elements in the 3D-IC design is represented as a thermal RC unit, when a transient temperature profile based on the 3D-IC model is generated. In some embodiments, generating a transient temperature profile based on the 3D-IC model comprises performing a finite element analysis on each of the plurality of points in the 3D-IC design based on a thermal resistance-capacitance (RC) network model. The method further comprises inputting a set of boundary conditions as the condition under which the 3D-IC design is to be operated, before performing the finite element analysis in some embodiments.

In some embodiments, the simulation is based on a thermal RC network model. FIGS. 6-7B, and 8A-8B illustrate the modeling approach used, from the level of the elements in the 3D-IC design, and the level of the points in the 3D-IC design for FEA, respectively.

Figure 6:
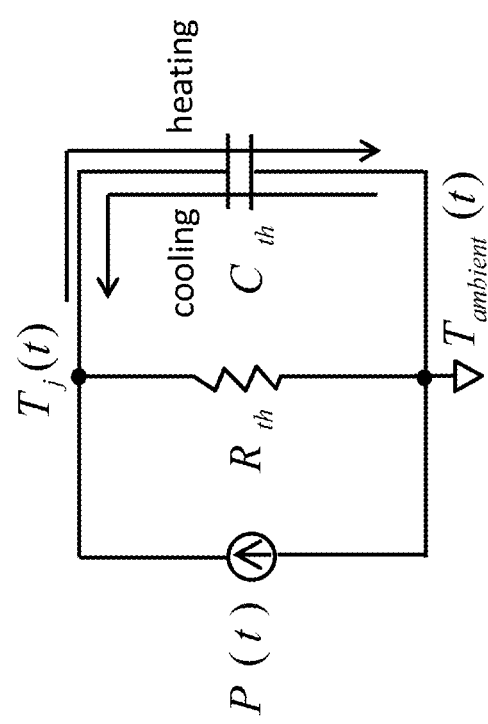
FIG. 6 illustrates a thermal resistance-capacitance (RC) unit representing one element in a 3D-IC design in some embodiments.
Figures 7A, 7B:
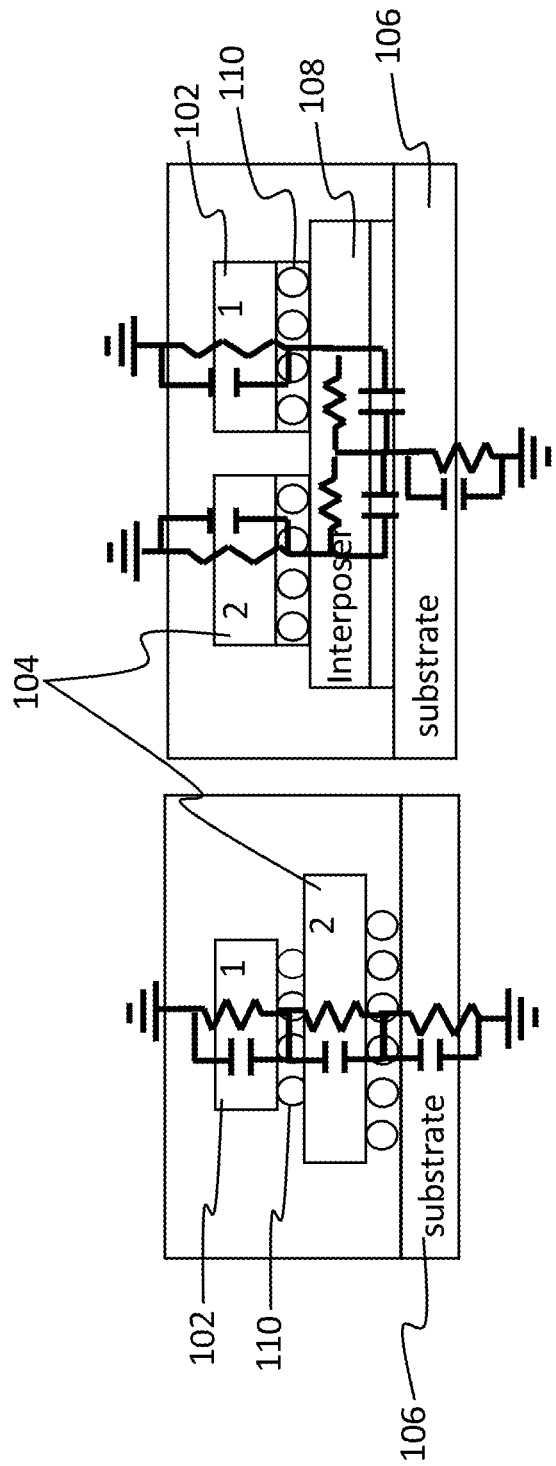
FIGS. 7A and 7B illustrate two examples of thermal RC diagrams representing two types of 3D-IC designs by using the thermal RC unit of FIG. 6.

FIG. 6 illustrates a thermal resistance-capacitance (RC) unit representing one element in a 3D-IC design in some embodiments. Each element of the 3D-IC design is described by a unit of two components comprising a thermal resistance (R) and a thermal capacitance (C). A virtual "thermal circuit," similar to an electric circuit, can be then used to represent the 3D-IC design. FIGS. 7A and 7B illustrate two examples of thermal RC diagrams representing two types of 3D-IC designs by using the thermal RC unit of FIG. 6.

In each thermal RC unit of FIG. 6, thermal resistance ($R_{th}$, in K/W) and thermal capacitance or thermal capacity ($C_{th}$, in J/K) can be described in the following equations:

$$R_{th} = \frac{L}{k \cdot A}$$

$$C_{th} = \rho \cdot c \cdot v$$

where
L (in m) is length of the element of the 3D-IC design represented by the RC unit;
A is the cross section area (in m$^2$);
k is thermal conductivity (in W/K.m) of the material of the element;
$\rho$ is the density of the material (in Kg/m$^3$);
c is the specific heat (in J. Kg$^{-1}$.K$^{-1}$); and
v is the volume of the element (m$^3$).

Based on the RC model, the transient temperature of an element can be calculated using the following equations:

$$Z_{th}(t) = \sum_{i=1}^{n} r_i \times \left(1 - e^{-\frac{t}{\tau_i}}\right)$$

$Z_{th}(t) = \text{delta}(T)/P$ $T_j(t) = P(t) \times Z_{th}(t) + T_{ambient}(t)$ where,
t is the operating time (s);
$Z_{th}(t)$ is a function defined as the temperature difference divided by power P;
delta(T) is difference between $T_j(t)$, the temperature of the element at a certain operating time t and the ambient temperature $T_{ambient(t)\ at\ the\ time\ t}$;
$\tau_i$ is a thermal time constant equal to the thermal R-C product (R*C); and
$r_i$ is the thermal resistance at the operating time.

In FIGS. 7A and 7B, like items are indicated by like reference numerals, and for brevity, descriptions of the structure, provided above with reference to FIG. 1, are not repeated. As shown in FIGS. 7A and 7B, the elements such as chips 102 (chip-1) and 104 (chip-2), substrate 106 and interposer 108 are represented in a RC unit of FIG. 6, respectively.

Figure 8B:
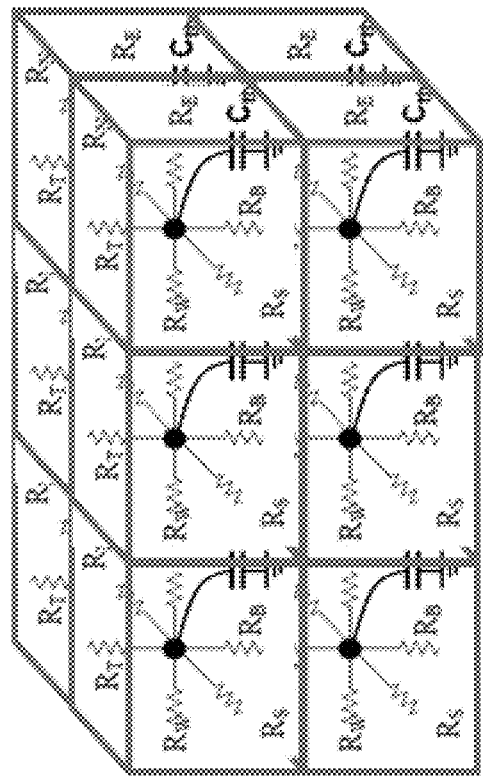
FIG. 8B illustrates a thermal RC network model for FEA modeling by using the thermal RC unit of FIG. 8A.
Figure 8A:
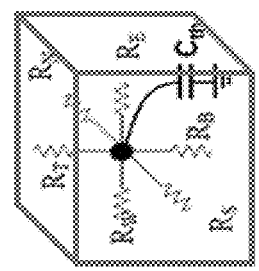
FIG. 8A illustrates a thermal RC unit representing one point in the 3D-IC design in accordance with some embodiments.

In some embodiments, an approach of FEA modeling is used based on the same principles described above. FIG. 8A illustrates a thermal RC unit representing one point in the 3D-IC design in accordance with some embodiments. FIG. 8B illustrates a thermal RC network model for FEA modeling by using the thermal RC unit of FIG. 8A. The RC unit of FIG. 8A are three-dimensionally interconnected to form the network shown in FIG. 8B. Such a network represents a 3D-IC design in three dimensions.

An exemplary FEA modeling can be performed according to the flow chart shown in FIG. 5. At step 205, boundary conditions are inputted into the thermal simulator 322 in computer processor 321. The boundary conditions are associated with a lower or upper limit for a certain operating conditions. Examples of the boundary conditions include, but are not limited to, environment temperature during the operation, and convection coefficient of the elements or a package on the 3D-IC design.

Figure 9A:
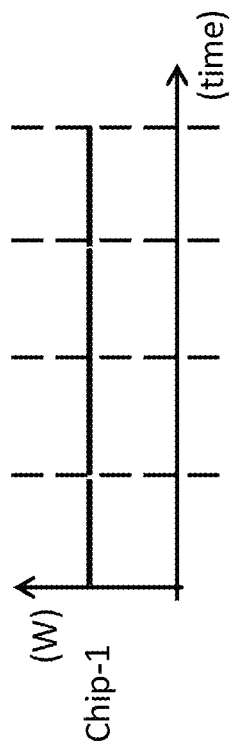
FIGS. 9A-9C illustrate the transient temperature profile of chip-1 based on the power profiles provided to chip-1 and chip-2 of FIG. 7A.
Figure 9B:
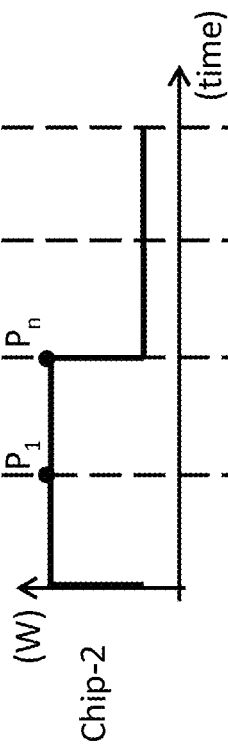
Figure 9C:
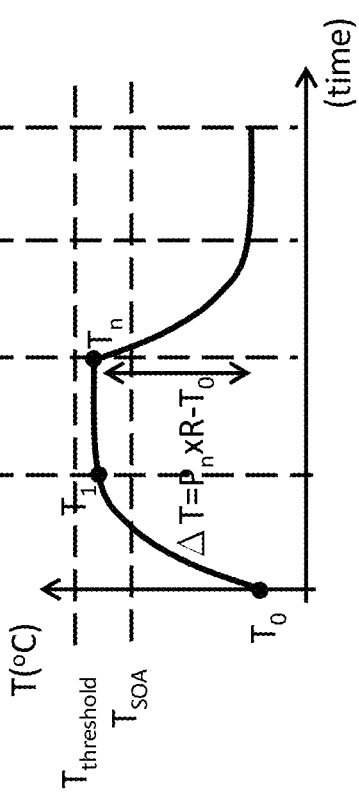

At step 207, thermal resistance capacitance (RC model) 330 is established as described. At step 209, FEA modeling is performed to generate a transient temperature profile 334. For example, FIGS. 9A and 9B illustrate the power profiles provided to chip-1 and chip-2 of FIG. 7A, respectively. FIG. 9C illustrates the transient temperature profile of chip-1 based on the power profiles in FIGS. 9A and 9B. The following equations can be also used for calculation of the transient temperature profile 334:

$$T_1 = T_0 + (\Delta P_1 \times R - T_0) \times (1 - e^{-time/\tau})$$

$$T_n = T_0 + (\Delta P_1 \times R - T_0) \times (1 - e^{-time/\tau})$$

$$(T_{threshold} - P \times R) e^{-time/\tau} + P \times R = T_{SOA}$$

where $T_n$ is the calculated temperature at a certain point n in the 3D-IC design's operating time interval; and $T_{threshold}$ and $T_{SOA}$ are defined as the threshold temperature allowed and the temperature allowable as a safe operation (SOA) criterion (shown in FIG. 9C).

Referring back to FIG. 2, at step 208, a potential thermal violation is identified at a corresponding operating time interval and a corresponding location of the plurality of points based on the 3D-IC design. At step 210, data representing the potential thermal violation are output to tangible, non-transient machine readable storage medium 332, and to displaying device 336. For example, medium 332 can be a CD-ROM and displaying device 336 can be a monitor displaying the data.

Figure 10:
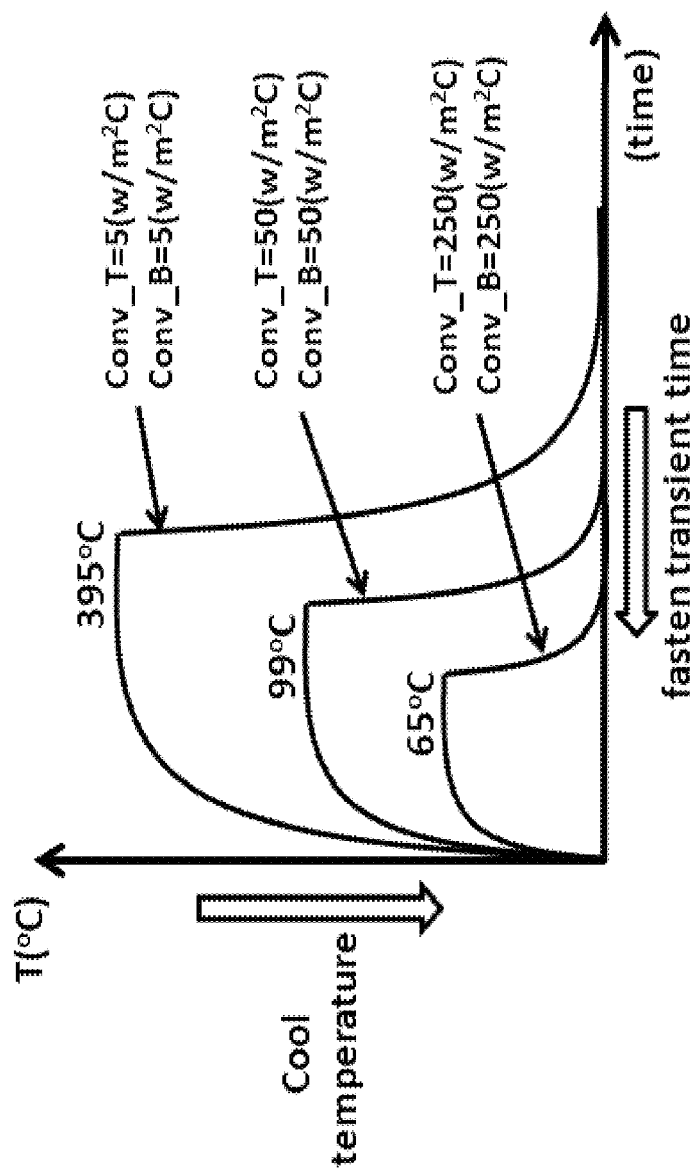
FIG. 10 illustrates a method of thermal management by increasing the convection coefficients as boundary conditions on the top and the bottom of a 3D-IC design.

FIGS. 10 and 11A-11D illustrate examples of identifying thermal violations under different boundary conditions and using a package to mitigate the thermal violation. In FIG. 10, convention coefficients on the top and the bottom of a 3D-IC design of FIG. 11A are used as boundary conditions. When the convection coefficients increase, the transient temperature decreases significantly. Increases in convection coefficients can be achieved in any desired methods such as using a cooling material or device, and changing the materials used in a 3D-IC design or its surrounding environment.

FIGS. 11A-11D illustrate a method for reducing chip temperature in a 3D-IC design using a package comprising thermal interface materials 150 and a lid 160. FIGS. 11B and 11D show top-down view of chip 104 on the 3D-IC design of FIGS. 11A and 11C, respectively. FIGS. 11A and 11B illustrate an example of a temperature profile of a 3D-IC design without using a package. The highest temperature in the middle of the chip is up to 103° C. As a comparison, FIGS. 11C and 11D illustrate an example of a temperature profile of the same 3D-IC design of FIG. 11A when a package comprising thermal interface materials 150 and a lid 160 is applied and operated under the same conditions. The temperature under the same operation conditions decreases to 90° C. These results provide a method for reducing chip temperature and decreasing transient time through thermal management by increasing convection coefficient of the environment or materials around the chip, and by using a proper package.

Referring back to FIG. 2, at step 212, in some embodiments, method 200 further comprises changing the power profile as a function of the operating time input in the computer processor 321, based on the data representing the potential thermal violation at the corresponding operating time interval and the corresponding location in the 3D-IC design. The power profile is changed to mitigate the potential thermal violation. In some embodiments, the power profile is changed by changing a time for turning at least one of the plurality of elements in the 3D-IC design on or off. In some embodiments, the power profile is changed by changing a power level to be applied on at least one of the plurality of elements in the 3D-IC design. In some other embodiments, both methods can be used, including changing a time for turning at least one of the plurality of elements on or off, and changing a power level to be applied on at least one of the plurality of elements in the 3D-IC design.

FIGS. 12A-12C illustrate a method for mitigating a potential thermal violation by changing a time for turning one element in a 3D-IC design on or off. FIGS. 13A-13C illustrate a method for mitigating a potential thermal violation by changing a power level to be applied on one element in the 3D-IC design. FIGS. 14A-14C illustrate a method for mitigating thermal violation by changing a time for turning one element in a 3D-IC design on or off, and changing a power level to be applied on the element, in accordance with some embodiments. In these examples, the temperature profile of Chip-1 of FIG. 7A are shown. The predetermined temperature value for safe operation is 110° C. Thus, a potential thermal violation is defined as when the FEA modeling of a 3D-IC design predicts that the temperature of an element in the 3D-IC design would exceed the predetermined temperature value of 110° C. when the 3D-IC design is operated at a certain condition. The power profiles are then changed to eliminate the potential thermal violation as shown in FIGS. 12C, 13C and 14C. The power profiles can be dynamically changed during an operation or for the purpose of designing a 3D-IC.

Referring back to FIG. 2, at step 214, in some embodiments, the method in the present disclosure optionally comprises changing the 3D-IC design to mitigate the potential thermal violation. At step 216, the changed 3D-IC design from the processor is output to a non-transitory storage medium, such as 332 or 336. Then the revised 3D-IC design data can be accessed from the non-transitory storage medium for fabricating a set of photomasks for the revised 3D-IC design. The 3D-IC design can be changed by changing the stack configuration of the plurality of elements comprising two or more IC chips and interposers in the 3D-IC design, or by changing the package in the 3D-IC design.

The present disclosure also provides a computer implemented system comprising: one or more processors 301 and 321; and at least one tangible, non-transitory machine readable medium encoded with one or more programs. The one or more programs can be executed by the one or more processors, to perform steps as described.

This present disclosure provides a computer implemented method and a system for thermal and power management in stacked IC design. The computer implemented method comprises accessing a three-dimensional integrated circuit (3D-IC) model stored in a tangible, non-transitory machine readable medium. The model represents a 3D-IC design to be fabricated and to be operated under a condition. The 3D-IC design comprises a plurality of elements such as semiconductor chips and interposer in a stack configuration. The method further comprises inputting a power profile in a computer processor. The power profile, being a function of an operating time, is applied to the plurality of elements in the 3D-IC design to be operated under the condition. The method further comprises generating a transient temperature profile in the computer processor based on the 3D-IC model. Such a transient temperature profile includes temperatures at a plurality of points of the 3D-IC design as a function of an operating time, based on the 3D-IC design operating under the power input and the condition. The method further comprises identifying a potential thermal violation at a corresponding operating time interval and a corresponding location of the plurality of points based on the 3D-IC design, and outputting data representing the potential thermal violation at the corresponding operating time interval and the corresponding location in the 3D-IC design.

In some embodiments, each of the plurality of elements in the 3D-IC design is represented as a thermal RC unit, when a transient temperature profile based on the 3D-IC model is generated. In some embodiments, generating a transient temperature profile based on the 3D-IC model comprises performing a finite element analysis on each of the plurality of points in the 3D-IC design based on a thermal RC network model. The method further comprises inputting a set of boundary conditions as the condition under which the 3D-IC design is to be operated, before performing the finite element analysis in some embodiments.

In some embodiments, the method further comprises changing the power profile as a function of the operating time input in the computer processor, based on the data representing the potential thermal violation at the corresponding operating time interval and the corresponding location in the 3D-IC design. The power profile is changed to mitigate the potential thermal violation. Changing the power profile comprises changing a time for turning on or off at least one of the plurality of elements in the 3D-IC design in some embodiments. Changing the power profile comprises changing a power level to be applied on at least one of the plurality of elements in the 3D-IC design in some other embodiments. The changing the power profile comprises changing a time for turning on or off at least one of the plurality of elements in the 3D-IC design, and changing a power level to be applied on at least one of the plurality of elements in the 3D-IC design in some embodiments.

In some embodiments, the method in the present disclosure comprises changing the 3D-IC design to mitigate the potential thermal violation. The method can comprise outputting from the processor the changed 3D-IC design to a non-transitory storage medium, for fabricating a set of photomasks for the 3D-IC design. The 3D-IC design can be changed by changing the stack configuration of the plurality of elements comprising two or more IC chips and interposers in the 3D-IC design, or by changing a package in the 3D-IC design.

In some embodiments, a computer implemented method comprises accessing a 3D-IC model stored in a tangible, non-transitory machine readable medium; inputting a power profile in a computer processor, generating a transient temperature profile in the computer processor based on the 3D-IC model; identifying a potential thermal violation at a corresponding operating time interval and a corresponding location of the plurality of points based on the 3D-IC design; and changing the power profile as a function of the operating time to mitigate the potential thermal violation, based on the data representing the potential thermal violation at the corresponding operating time interval and the corresponding location in the 3D-IC design.

The transient temperature profile includes temperatures at a plurality of points of the 3D-IC design as a function of an operating time, based on the 3D-IC design operating under the power input and the condition. The transient temperature profile can be a response of the power profile as a function of the operating time in a non-steady state.

In some embodiments, generating a transient temperature profile based on the 3D-IC model comprises: inputting a set of boundary conditions as the condition under which the 3D-IC design is to be operated; and performing a finite element analysis on each of the plurality of points in the 3D-IC design based on a thermal RC network model. The method can further comprises changing the 3D-IC design to mitigate the potential thermal violation, and outputting from the processor the changed 3D-IC design to a non-transitory storage medium for fabricating a set of photomasks for the 3D-IC design.

The present disclosure also provides a computer implemented system comprising: one or more processors; and at least one tangible, non-transitory machine readable medium encoded with one or more programs. The one or more programs can be executed by the one or more processors, to perform steps of accessing a 3D-IC model stored in a tangible, non-transitory machine readable medium, and inputting a power profile in a computer processor. The power profile being a function of an operating time is applied to the plurality of elements in the 3D-IC design to be operated under the condition.

The functions of the one or more programs further comprise generating a transient temperature profile in the computer processor based on the 3D-IC model. The transient temperature profile includes temperatures at a plurality of points of the 3D-IC design as a function of an operating time, based on the 3D-IC design operating under the power input and the condition. The functions of the one or more programs further comprise identifying a potential thermal violation at a corresponding operating time interval and a corresponding location of the plurality of points based on the 3D-IC design, and outputting data representing the potential thermal violation at the corresponding operating time interval and the corresponding location in the 3D-IC design.

In some embodiments, generating a transient temperature profile based on the 3D-IC model comprises: inputting a set of boundary conditions as the condition under which the 3D-IC design is to be operated, and performing a finite element analysis on each of the plurality of point in the 3D-IC design based on a thermal RC network model. In some embodiments, the functions of the one or more programs further comprise: changing the power profile as a function of the operating time to mitigate the potential thermal violation. In some other embodiments, the functions of the one or more programs further comprise changing the 3D-IC design comprising the plurality of the elements and a package to mitigate the potential thermal violation.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A computer implemented method comprising:
  accessing a three-dimensional integrated circuit (3D-IC) model stored in a tangible, non-transitory machine readable medium, the model representing a 3D-IC design to be fabricated and to be operated under a condition, the 3D-IC design comprising:
  a plurality of elements in a stack configuration;

inputting a power profile in a computer processor, the power profile being a function of an operating time and applied to the plurality of elements in the 3D-IC design to be operated under the condition;

generating a transient temperature profile in the computer processor based on the 3D-IC model, the transient temperature profile including temperatures at a plurality of points of the 3D-IC design as a function of an operating time, based on the 3D-IC design operating under the power input and the condition, wherein each of the plurality of elements in the 3D-IC design is represented as a thermal resistance-capacitance (RC) unit;

identifying a potential thermal violation at a corresponding operating time interval and a corresponding location of the plurality of points based on the 3D-IC design;

outputting data representing the potential thermal violation at the corresponding operating time interval and the corresponding location in the 3D-IC design; and changing the power profile as a function of the operating time input in the computer processor, based on the data representing the potential thermal violation at the corresponding operating time interval and the corresponding location in the 3D-IC design.

2. The method of claim 1, wherein generating a transient temperature profile based on the 3D-IC model comprises:
performing a finite element analysis on each of the plurality of points in the 3D-IC design based on a thermal resistance-capacitance (RC) network model.

3. The method of claim 2, further comprising:
inputting a set of boundary conditions as the condition under which the 3D-IC design is to be operated, before performing the finite element analysis.

4. The method of claim 1, wherein changing the power profile comprises changing a time for turning on or off at least one of the plurality of elements in the 3D-IC design.

5. The method of claim 1, wherein changing the power profile comprises changing a power level to be applied on at least one of the plurality of elements in the 3D-IC design.

6. The method of claim 1, wherein the changing the power profile comprises changing a time for turning on or off at least one of the plurality of elements in the 3D-IC design, and changing a power level to be applied on at least one of the plurality of elements in the 3D-IC design.

7. The method of claim 1, further comprising:
changing the 3D-IC design to mitigate the potential thermal violation.

8. The method of claim 7, further comprising:
outputting from the processor the changed 3D-IC design to a non-transitory storage medium, for fabricating a set of photomasks for the 3D-IC design.

9. The method of claim 7, wherein the 3D-IC design is changed by changing the stack configuration of the plurality of elements comprising two or more IC chips and interposers in the 3D-IC design.

10. The method of claim 7, wherein the 3D-IC design is changed by changing a package in the 3D-IC design.

11. A computer implemented method comprising:
accessing a three-dimensional integrated circuit (3D-IC) model stored in a tangible, non-transitory machine readable medium, the model representing a 3D-IC design to be fabricated and to be operated under a condition, the 3D-IC design comprising:
a plurality of elements in a stack configuration;
inputting a power profile in a computer processor, the power profile being a function of an operating time and applied to the plurality of elements in the 3D-IC design to be operated under the condition;

generating a transient temperature profile in the computer processor based on the 3D-IC model, the transient temperature profile including temperatures at a plurality of points of the 3D-IC design as a function of an operating time, based on the 3D-IC design operating under the power input and the condition, wherein each of the plurality of elements in the 3D-IC design is represented as a thermal resistance-capacitance (RC) unit;

identifying a potential thermal violation at a corresponding operating time interval and a corresponding location of the plurality of points based on the 3D-IC design;

changing the power profile as a function of the operating time to mitigate the potential thermal violation, based on the data representing the potential thermal violation at the corresponding operating time interval and the corresponding location in the 3D-IC design; and changing the 3D-IC design to mitigate the potential thermal violation.

12. The method of claim 11, wherein:
the transient temperature profile is a response of the power profile as a function of the operating time in a non-steady state.

13. The method of claim 11, wherein generating a transient temperature profile based on the 3D-IC model comprises:
inputting a set of boundary conditions as the condition under which the 3D-IC design is to be operated; and
performing a finite element analysis on each of the plurality of points in the 3D-IC design based on a thermal resistance-capacitance (RC) network model.

14. The method of claim 11, further comprising:
outputting from the processor the changed 3D-IC design to a non-transitory storage medium for fabricating a set of photomasks for the 3D-IC design.

15. A computer implemented system comprising:
one or more processors; and
at least one tangible, non-transitory machine readable medium encoded with one or more programs, to be executed by the one or more processors, to perform steps of:
accessing a three-dimensional integrated circuit (3D-IC) model stored in a tangible, non-transitory machine readable medium, the model representing a 3D-IC design to be fabricated and to be operated under a condition, the 3D-IC design comprising:
a plurality of elements in a stack configuration;
inputting a power profile in a computer processor, the power profile being a function of an operating time and applied to the plurality of elements in the 3D-IC design to be operated under the condition;
generating a transient temperature profile in the computer processor based on the 3D-IC model, the transient temperature profile including temperatures at a plurality of points of the 3D-IC design as a function of an operating time, based on the 3D-IC design operating under the power input and the condition, wherein each of the plurality of elements in the 3D-IC design is represented as a thermal resistance-capacitance (RC) unit;
identifying a potential thermal violation at a corresponding operating time interval and a corresponding location of the plurality of points based on the 3D-IC design;
outputting data representing the potential thermal violation at the corresponding operating time interval and the corresponding location in the 3D-IC design, and
changing the power profile as a function of the operating time to mitigate the potential thermal violation.

16. The system of claim 15, wherein generating a transient temperature profile based on the 3D-IC model comprises:

inputting a set of boundary conditions as the condition under which the 3D-IC design is to be operated; and performing a finite element analysis on each of the plurality of point in the 3D-IC design based on a thermal resistance-capacitance (RC) network model.

17. The system of claim 15, wherein the functions of the one or more programs further comprise:

changing the 3D-IC design comprising the plurality of the elements and a package in the 3D-IC design to mitigate the potential thermal violation.

* * * * *